(No Model.)
B. C. RIGDON & S. DOBSON.
STUMP PULLER.
No. 606,391.
Patented June 28, 1898.
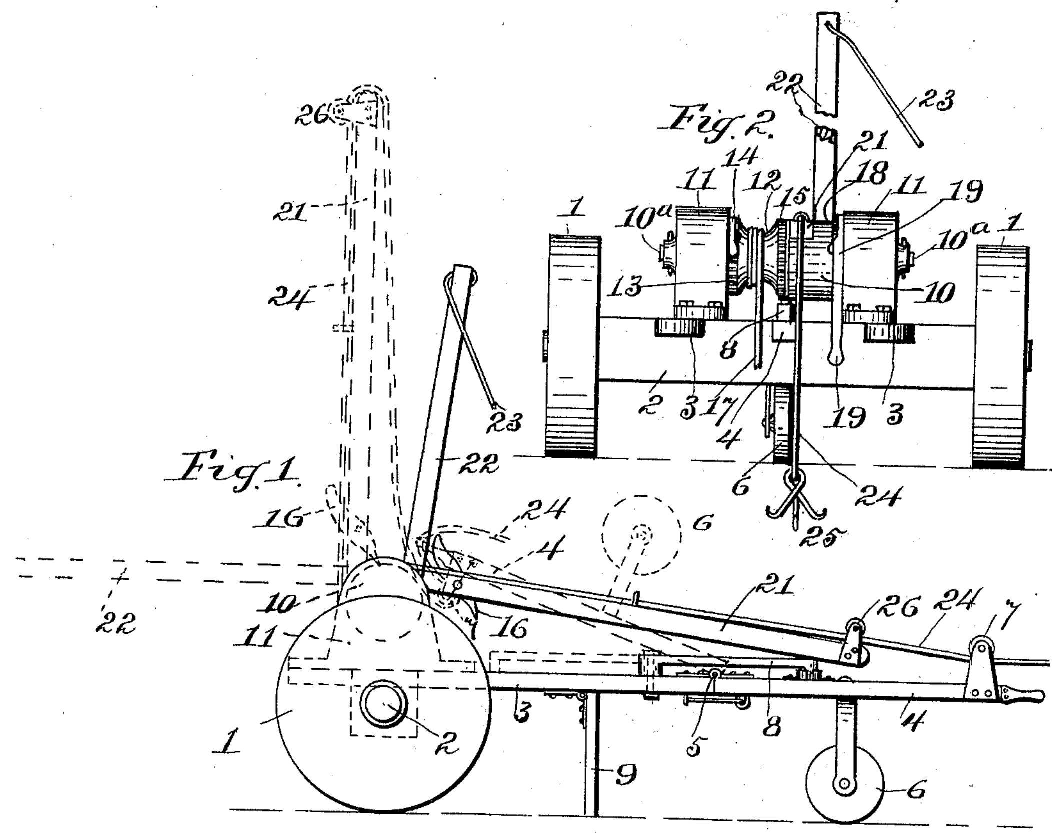
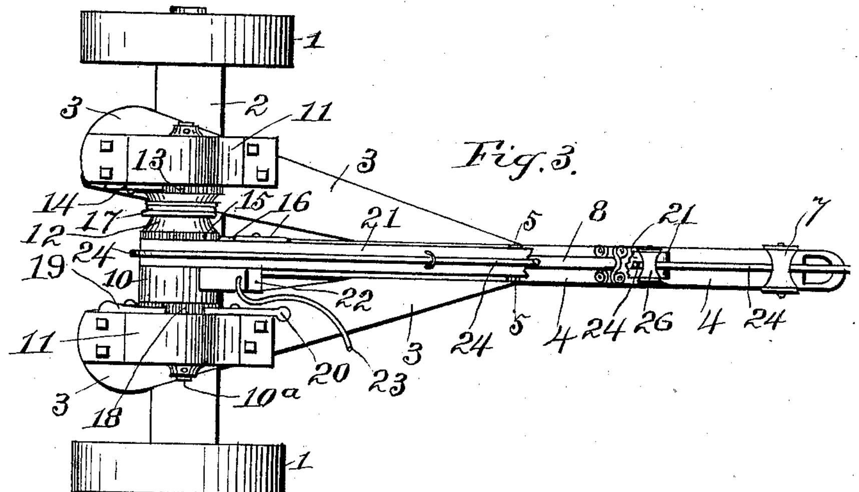
Fig. 4.
Witnesses.
E. C. Clark.
M. M. Bond.
Inventors.
Berryan C. Rigdon
Seaborn Dobson
By W. H. Wills.
Attorney.
THE NORRIS PETERS CO., PHOTO-LITHO., WASHINGTON, D. C.

UNITED STATES PATENT OFFICE.

BERRYAN C. RIGDON AND SEABORN DOBSON, OF NEAR LAKE BUTLER, FLORIDA.

STUMP-PULLER.

SPECIFICATION forming part of Letters Patent No. 606,391, dated June 28, 1898.

Application filed January 14, 1898. Serial No. 666,646. (No model.)

*To all whom it may concern:*

Be it known that we, BERRYAN C. RIGDON and SEABORN DOBSON, citizens of the United States, residing near Lake Butler, in the counties of Baker and Bradford, respectively, and State of Florida, have invented certain new and useful Improvements in Stump-Pullers, of which the following is a specification.

This invention relates to stump-pullers; and the object of the invention is to provide a stump-pulling machine of novel and peculiar construction and arrangement of parts, wherein two draft or pull cables are operated jointly or independently, as occasion may require, to extricate a stump and its roots.

In the drawings, Figure 1 is a side elevation of the machine, showing in dotted lines the tongue folded and the levers in position to pull a stump. Fig. 2 is a rear view. Fig. 3 is a top view. Fig. 4 is a longitudinal section of the lever-block and the drum.

The same numeral references denote the same parts throughout the several figures of the drawings.

The truck of the machine consists of two suitable wheels 1, axle 2, and hounds 3. The tongue 4 is hinged or pivoted at 5 to the hounds, so that the tongue may be folded back for convenience in moving or placing the machine to be operated closer to a stump than would be possible with an ordinary tongue. The tongue has a swiveled guide-wheel 6, a pulley 7, and a locking-bar 8 to hold the tongue rigid in extended position. A leg or prop 9 is hinged to the under side of the hounds to support them while the machine is in operation.

A cylindrical lever-block 10 is loosely mounted on a shaft $10^a$, fixed to projections 11 of the hounds and axle. A winding-drum 12 is loosely mounted on said shaft adjacent the said block and has ratchet-teeth 13, engaged by a pawl 14 on one of the projections 11, and similar teeth 15, engaged by a pawl 16 on a lever 22. A cable 17 is secured to the drum between the teeth 13 and 15 and is wound thereon as hereinafter to be described.

One end of the lever-block 10 is conical to fit a conical recess in the end of the drum 12, so that the adjacent ends of the block and drum overlap and thereby form a solid close bearing. The other end of the said block has ratchet-teeth 18, engaged by pawls 19 and 20 on the other of the said projections 11.

Levers 21 and 22 are secured at right angles to each other to the block 10, and the lever 22 has a hand-rope 23 attached for operating the levers and the block.

A pull or draft cable 24, having a dog or grapple 25, extends through a sheave 26 on the lever 21 and through the sheave 7 on the end of the tongue where the draft or power is applied to said cable for pulling the latter.

To extricate a stump, the machine is operated as follows, after being placed as near the stump as possible: The pawls 19 and 20 being disengaged from the block-teeth, the hand-rope is operated to throw the lever 22 back as far as possible. (See dotted lines, Fig. 1.) The cable 24 being slack, the pawls 19 and 20 put in engagement with the block-teeth to hold the block rigid, the grapple is attached to the stump. Then the said pawls are displaced and the cable 24 pulled, which turns the block and levers forward and extricates the stump. In case the stump is too long or has deeply-seated roots or for any other reason this operation will not entirely extricate the stump and its roots the cable 17 is attached to the grapple 25 and the levers 21 and 22 are worked back and forth by the hand-rope, which turns the block 12 backward independent of the said drum, the latter being held by the pawl 14, and in the forward movement of the levers and block the drum is turned with the block by the pawl 16. This back-and-forth movement of the levers may be continued until the stump and its roots are entirely free.

Having thus described our invention, what we claim as new, and desire to secure by Letters Patent, is—

1. In a stump-puller the combination, with a block loosely mounted to turn, the levers secured to the block, and a draft-cable carried by one of said levers, of a drum having ratchet-teeth and loosely mounted on the end of the said block, and a draft-cable secured to the drum, substantially as set forth.

2. In a stump-puller the combination, with the block loosely mounted to turn and provided with ratchet-teeth, levers secured to the block, a draft-cable carried by one of said levers, and pawls to control the movement of said block, of a drum having ratchet-teeth upon each end and loosely mounted on the end of the block opposite the said block-teeth, a draft-cable secured to the drum, and the drum-pawls, substantially as set forth.

3. The combination, in a stump-pulling machine, of a block loosely mounted in the machine and having a toothed end and a conical end, levers secured to the block at right angles, a toothed drum having a recess to fit the conical end of said block, and the pawls for turning the drum and block together or independently by moving said levers, as set forth.

In witness whereof we hereunto set our hands in the presence of two witnesses.

BERRYAN C. RIGDON.

SEABORN his × mark DOBSON.

Witnesses:
R. F. BOWMAN,
J. W. MANN.